United States Patent [19]

Kautz et al.

[11] Patent Number: 4,891,028

[45] Date of Patent: Jan. 2, 1990

[54] SHIELDING MEANS AND PROCESS FOR USE IN THE MANUFACTURE OF TENSION MASK COLOR CATHODE RAY TUBES

[75] Inventors: Allan D. Kautz, Naperville; Johann Steiner, Des Plaines, both of Ill.

[73] Assignee: Zenith Electronics Corporation, Glenview, Ill.

[21] Appl. No.: 336,283

[22] Filed: Apr. 11, 1989

[51] Int. Cl.⁴ .............................................. H01J 9/20
[52] U.S. Cl. .................................. 445/30; 219/121.72
[58] Field of Search ..................... 445/30; 219/121.67, 219/121.72

[56] References Cited

U.S. PATENT DOCUMENTS 4,695,761 9/1987 Fendley ........................... 445/30 X
4,778,427 10/1988 Strauss .............................. 445/30

Primary Examiner—Kenneth J. Ramsey

[57] ABSTRACT

Shielding means are disclosed for use in the manufacture of a tension mask color cathode ray tube having a glass faceplate and a substantially rectangular mask support structure having outwardly tapered sides for deflecting a mask-trimming laser beam away from the glass. The shielding means according to the invention are detachably supported by the support structure, or by the faceplate, for bridging only the corner areas of the support structure where the glass is exposed. The shielding means have a configuration effective to intercept the laser beam and shield the glass from the destructive effects of the laser beam. A process for use of the shielding means in manufacture is also disclosed.

6 Claims, 3 Drawing Sheets

U.S. Patent    Jan. 2, 1990    Sheet 1 of 3    4,891,028
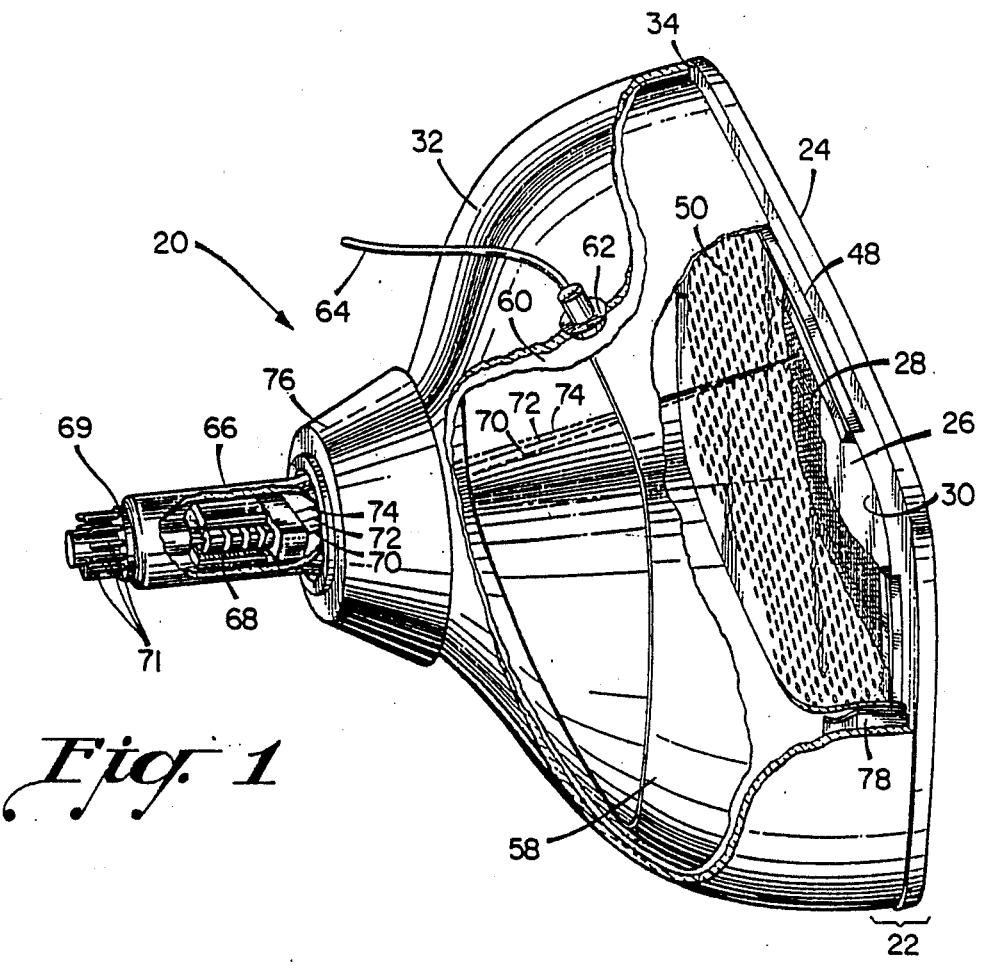
Fig. 1
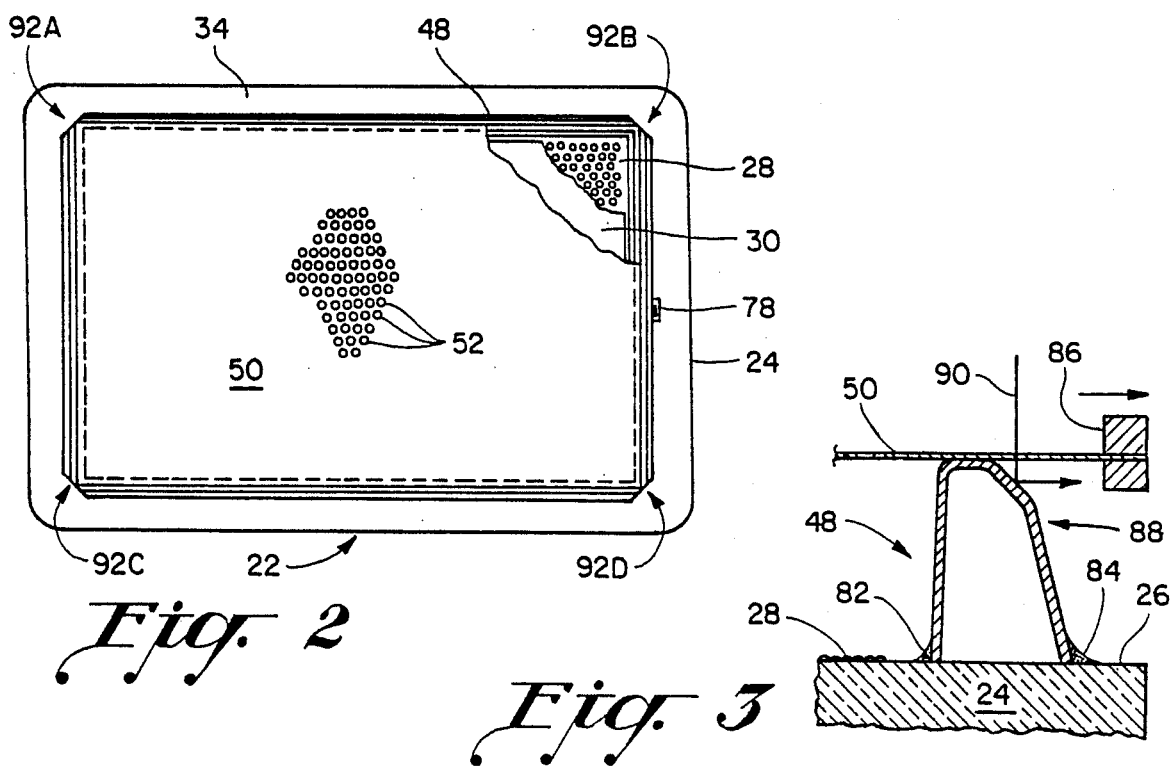
Fig. 2
Fig. 3

SHIELDING MEANS AND PROCESS FOR USE IN THE MANUFACTURE OF TENSION MASK COLOR CATHODE RAY TUBES

CROSS-REFERENCE TO RELATED APPLICATIONS

This application is related to but in no way dependent upon copending applications Ser. No. 058,095 filed June 4, 1987, now U.S. Pat. No. 4,828,523; Ser. No. 051,896 filed May 18, 1987, now U.S. Pat. No. 4,790,786; and Ser. No. 269,822 filed Nov. 11, 1988, all of common ownership herewith.

BACKGROUND OF THE INVENTION

This invention relates to color cathode ray picture tubes, and is addressed specifically to the manufacture of tubes having shadow masks of the tension foil type in association with a substantially flat faceplate. The invention is useful in the manufacture of color tubes of various types, including those used in home entertainment television receivers, and in medium-resolution and high-resolution tubes intended for color monitors.

The tension foil shadow mask is a part of the cathode ray tube front assembly, and is located in close adjacency to the faceplate. As used herein, the term "shadow mask" means an apertured metallic foil which may, by way of example, be about 0.001 inch thick, or less. The mask is supported in high tension a predetermined distance from the inner surface of the faceplate. As is well known in the art, the shadow mask acts as a color-selection electrode, or parallax barrier, which ensures that each of the three beams generated by the electron gun located in the neck of the tube lands only on its assigned phosphor deposits.

In referent copending application Ser. No. 058,095 of common ownership, there is disclosed a support structure having a mask-receiving surface for receiving and supporting a foil shadow mask in tension by laser weldments. The welding apparatus includes means for severing the mask from a fixture holding the mask in tension; the fixture is fully described and claimed in referent copending application Ser. No. 051,897. In severing the mask from the holding fixture, the beam is moved in severing relationship with the mask, and the intensity and operating mode of the beam is controlled for the positive severing of the mask from a holding fixture.

As noted, the shadow mask is composed of a steel foil having a thickness of about 0.001 inch. THe continuous-wave power of the severing laser beam is about 200 watts, a magnitude of power necessary to severe the mask quickly and effectively.

It was found that any overshoot of the mask-severing beam, when falling on the glass of the inner surface of the faceplate, caused cracking and spalling of the glass. To prevent this destruction, an aluminum shield about 5 mils thick was initially used in production to intercept the high-energy beam and thus shield the glass of the faceplate. The shield was in the form of a frame which enclosed the mask support structure. The limited space between the mask and the panel makes it difficult to design a structurally sound shield, one that would fit tightly enough against the support structure to prevent penetration of the cutoff beam past the shield and consequent destruction of the glass.

OBJECTS OF THE INVENTION

It is a general object of the invention to provide means and a process for facilitating the manufacture of color cathode ray tubes having a tensed foil shadow mask.

It is another object of this invention to provide a process for use in the manufacture of tension mask faceplate assemblies that simplifies manufacture and reduces manufacturing costs.

It is an object of the invention to provide means and a process for preventing destruction of faceplate assemblies of tension mask color cathode ray tubes during late stages of manufacture.

It is a further object of this invention to provide an effective means and process for preventing destruction of faceplate glass from the effects of a high-energy beam used in manufacture.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings (not to scale), in the several figures of which like reference numerals identify like elements, and in which:

FIG. 1 is a side view in perspective of a tension mask color cathode ray tube subject to manufacture according to the invention, with cut-away sections that indicate the location and relationship of major components of the tube;

FIG. 2 is a plan view of the front assembly of the tube shown by FIG. 1, with parts cut away to show the relationship of the faceplate with the mask support structure and shadow mask; an inset depicts mask apertures greatly enlarged;

FIG. 3 is a cross-sectional view in elevation of the metallic laser-deflecting tension mask support structure described and claimed in referent copending application Ser. No. 269,822; the structure is indicated as being secured to a faceplate;

DESCRIPTION OF THE PREFERRED EMBODIMENT

Figure 4A:
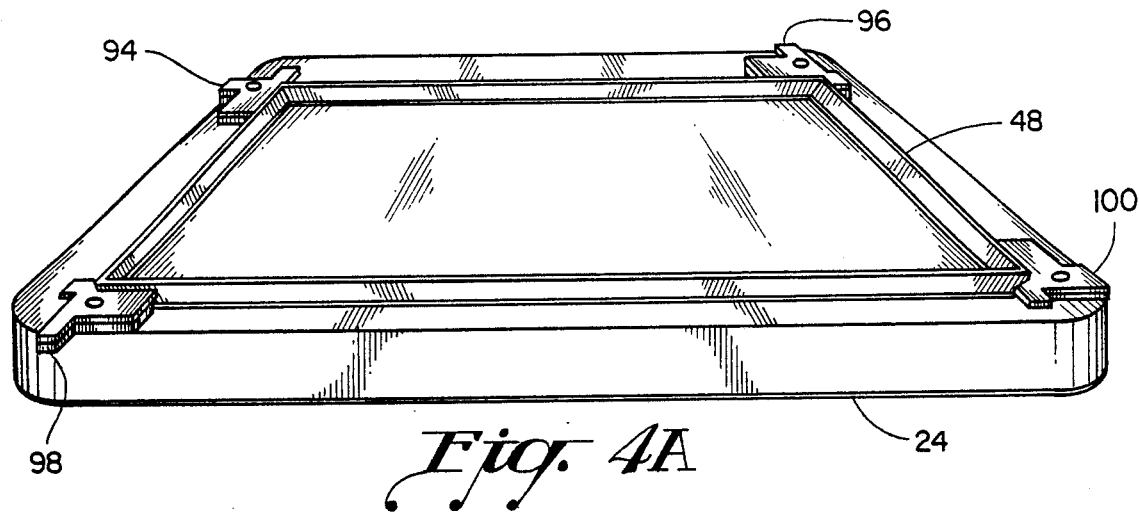
FIGS. 4A is a perspective view of an in-process faceplate with an embodiment of shielding means means according to the invention attached to a mask support structure.

A tension mask color cathode ray tube subject to manufacture using the means and process according to the invention is depicted in FIG. 1. The tube and its components are identified in FIGS. 1 and 2, and described in the following paragraphs in this sequence: reference number, a reference name, and a brief description of structure, interconnections, relationship, functions, operation, and/or result, as appropriate.

20 tension mask color cathode ray tube
  22 faceplate assembly
  24 glass faceplate
  26 inner surface of faceplate
  28 centrally disposed phosphor screen
  30 film of aluminum
  32 funnel
  34 peripheral sealing area of faceplate 24, adapted to mate with the peripheral sealing area of funnel 32
  48 shadow mask support structure indicated as being substantially rectangular in enclosing the screen 28
  50 metal foil shadow mask; after being tensed, the mask is mounted on support structure 48 and secured thereto as by laser welding
  52 shadow mask apertures, indicated as greatly enlarged in the inset for illustrative purposes 58 internal magnetic shield
  60 internal conductive coating on funnel
  62 anode button
  64 high-voltage conductor
  66 neck of tube
  68 in-line electron gun providing three discrete in-line electron beams 70, 72 and 74 for exciting the respective red-light-emitting, green-light-emitting, and blue-light-emitting phosphor deposits on screen 28
  69 base of tube
  71 metal pins for conducting operating voltages and video signals through base 69 to electron gun 68
  76 yoke which provides for the traverse of beams 70, 72 and 74 across screen 28
  78 contact spring which provides an electrical path between the funnel coating 60 and the mask support structure 48.

The configuration of the foil shadow mask support structure 48 shown by FIGS. 1 and 2 is indicated in greater detail in FIG. 3. Structure 48, indicated symbolically as being composed of metal, is shown as being attached to the inner surface 26 of faceplate 24 by beads 82 and 84 of solder glass, noted as being devitrified. Support structure 48 is so structured and arranged as to intercept a high-energy beam, such as a laser beam, used to trim post-weld shadow mask waste material and protect the faceplate from the beam. This structure is fully described and claimed in referent copending application Ser. No. 269,822, of common ownership herewith.

Further with regard to FIG. 3, foil shadow mask 50 is indicated symbolically as being stretched by stretching fixture 86, indicated by the associated arrow, to plate the mask 50 under proper mechanical tension, a process step that takes place during tube manufacture. Support structure 48 will be noted as having an outwardly tapering side 88 for deflecting the mask-trimming laser beam 90 away from the inner surface 26 of glass faceplate 24.

Support structure 48 is noted as being effective in deflecting the laser beam away from the glass of the faceplate except in corner areas of the faceplate, such as corner areas 92A, 92B, 92C and 92D indicated in FIG. 2. Shielding means according to the invention, detachably engaged with support structure 48, provide for bridging only the corner areas 92A, 92B, 92C and 92D of the support structure where the glass of the faceplate is exposed.

Figure 4B:
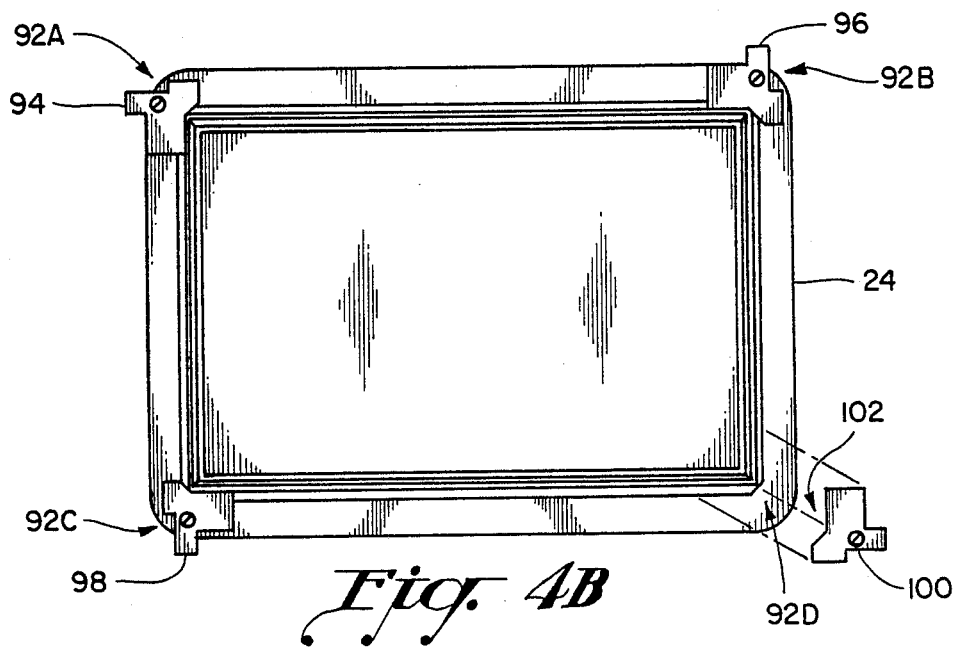
FIG. 4B is a view similar to FIG. 4A but depicting one of the shielding means exploded from the support structure.

Shielding means 94, 96, 98 and 100 according to the invention are depicted in FIGS. 4A and 4B as being detachably engaged with support structure 48 in respective corners 92A, 92B, 92C and 92D; the faceplate is noted as being the faceplate 24 shown by FIGS. 1 and 2 when in an in-process state. The shielding means 94, 96, 98 and 100 are noted as being identical in configuration.

Figure 4C:
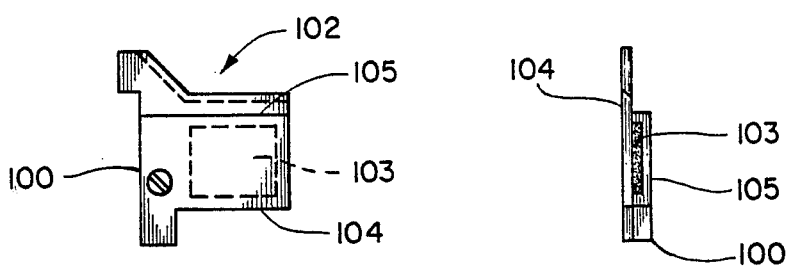
FIGS. 4C and 4D are plan and elevation views respectively showing details of the shielding means.

The configuration of shielding means 100 is indicated in greater detail in FIG. 4C; the profile 102 of shielding means 100 that contacts the slanting side 88 of support structure 48 provides for the intimate contact of the shield with the support structure effective to bridge only the corner areas to intercept a mask-trimming laser beam, and shield the glass of the faceplate from the destructive effects of the beam.

Figure 4D:
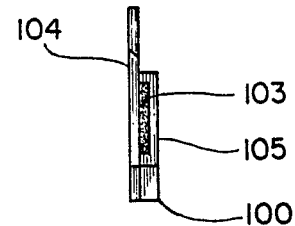

In this embodiment of the shielding means according to the invention, shielding means 94, 96, 98 and 100 are detachably engaged with support structure 48, noted as being metal, by magnetic means. The magnetic means 103, which may comprise a slab of sintered neodymium material, is indicated in FIGS. 4C and 4D as being attached to a steel shield 104, which is shaped to form the aforementioned profile 102. Magnetic means 103 is shown as being retained in a housing 105 of plastic such as Delrin (R). The flux of magnetic means 103 flows through steel shield 104, causing the profile 102 of the shielding means 100 to adhere closely to the metal of support structure 48.

In a production step preparatory to welding and trimming the mask, the four shielding means 94, 96, 98 and 100 are detachably engaged to the support structure 48 by manually pressing each against the structure to attach the respective magnets 104 to the structure.

Figure 5:
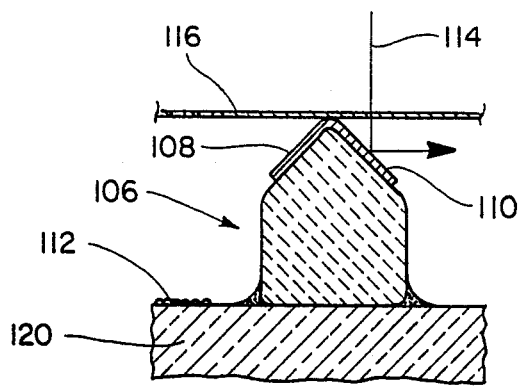
FIG. 5 is a cross-sectional view in elevation of a laser-deflecting tension mask support structure composed primarily of a ceramic, a configuration described and claimed in referent copending application Ser. No. 269,822; the structure is indicated as being secured to a faceplate.

Another configuration of a laser-beam-deflecting shadow mask support structure, also described and claimed in referent copending application Ser. No. 269,822 of common ownership, is depicted in FIG. 5. Support structure 106 includes a steel component as indicated symbolically, and the body is indicated as being formed from a ceramic. Support structure 106 has in cross-section the aspect of a house with a saddle roof with sloping sides over which is folded metal member 108. The sloping side 110 of metal member 108, which faces outwardly with respect to the screen 112, provides for deflecting, except in corner areas, laser beam 114 away from the glass of the faceplate 120. It is the function of the shielding means according to the invention to bridge the corner areas.

Figure 6A:
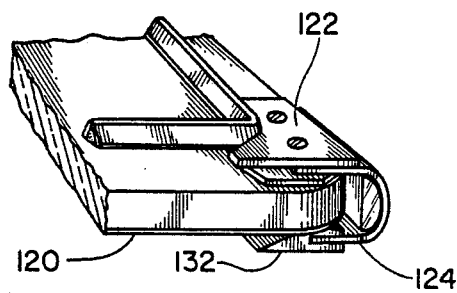
FIG. 6A is a perspective view of a corner of a faceplate showing the attachment of another embodiment of the invention to the support structure of FIG. 5.
Figure 6B:
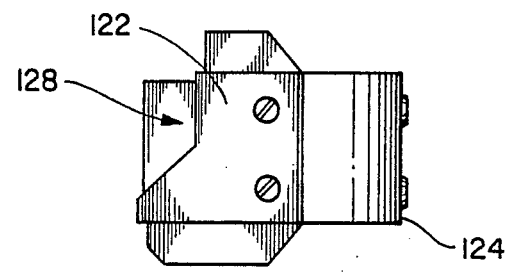
FIGS. 6B and 6C are respective plan and perspective views showing further details of the embodiment of FIG. 6A.
Figure 6C:
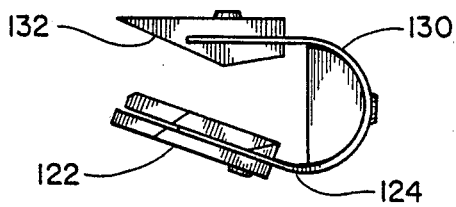

With reference now to FIGS. 6A, 6B and 6C, shielding means 122 are held in place against the embodiment of the support structure 106 depicted in FIG. 5 by mechanical clamping means 124 for detachably engaging the faceplate 120, one corner of which is shown. As with the profile 102 of shielding means 100 depicted in FIG. 4C, profile 128 is configured to bridge only the corner areas of support structure 106 where the glass of the faceplate is exposed, and is thus effective in intercepting a laser beam and shielding the faceplate glass from the destructive effects of the beam. As indicated by FIG. 6C, the mechanical clamping means may comprise spring means 130 which are manually flexed during production for detachable engagement of the shielding means, one to each corner of the faceplate 120. Pad 132 is contoured to grip the bottom of the faceplate, as indicated by FIG. 6A.

While a particular embodiment of the invention has been shown and described, it will be readily apparent to those skilled in the art that changes and modifications may be made in the inventive means and process without departing from the invention in its broader aspects, and therefore, the aim of the appended claims is to cover all such changes and modifications as fall within the true spirit and scope of the invention.

We claim:

1. For use in the manufacture of a tension mask color cathode ray tube having a glass faceplate and a substantially rectangular mask support structure having outwardly tapered sides for deflecting a mask-trimming laser beam away from said glass, shielding means detachably engaged to said support structure for bridging only the corner areas of said support structure where said glass is exposed, said shielding means having a configuration effective to intercept said laser beam and shield said glass from the destructive effects of said beam.

2. The shielding means according to claim 1 wherein said mask support structure includes steel and wherein said shielding means are detachably engaged with said support structure by magnetic means.

3. The shielding means according to claim 1 wherein said shielding means are held in place against said support structure by mechanical clamping means for gripping said faceplate.

4. For use in the manufacture of a tension mask color cathode ray tube having a glass faceplate and a substantially rectangular mask support structure with outwardly tapered sides for intercepting a mask-trimming laser beam except in corner areas of said support structure, a process comprising:

providing shielding means for attachment in said corner areas of said mask support structure, said shielding means being configured to bridge said corner areas and intercept said beam; and detachably engaging said shielding means to said faceplate and support structure for shielding said glass of said beam.

5. The process according to claim 4 including providing steel in said mask support structure and detachably engaging said support structure with said support structure by magnetic means.

6. The process according to claim 4 including gripping said faceplate by mechanical clamping means for holding said shielding means against said support structure.

* * * * *